United States Patent
Yamazaki et al.

(10) Patent No.: US 11,072,305 B2
(45) Date of Patent: Jul. 27, 2021

(54) PASSENGER SEAT AIR BAG APPARATUS

(71) Applicants: Toyota Jidosha Kabushiki Kaisha, Toyota (JP); Toyoda Gosei Co., Ltd., Kiyosu (JP)

(72) Inventors: Yasunobu Yamazaki, Okazaki (JP); Mitsuyoshi Ohno, Miyoshi (JP); Ikuo Yamada, Kiyosu (JP)

(73) Assignees: Toyota Jidosha Kabushiki Kaisha, Toyota (JP); Toyoda Gosei Co., Ltd., Kiyosu (JP)

( * ) Notice: Subject to any disclaimer, the term of this patent is extended or adjusted under 35 U.S.C. 154(b) by 6 days.

(21) Appl. No.: 16/175,017

(22) Filed: Oct. 30, 2018

(65) Prior Publication Data

US 2019/0126883 A1 May 2, 2019

(30) Foreign Application Priority Data

Oct. 31, 2017 (JP) .............................. JP2017-210800

(51) Int. Cl.
*B60R 21/16* (2006.01)
*B60R 21/233* (2006.01)
*B60R 21/2338* (2011.01)
*B60R 21/231* (2011.01)
(Continued)

(52) U.S. Cl.
CPC .......... *B60R 21/233* (2013.01); *B60R 21/231* (2013.01); *B60R 21/2338* (2013.01); *B60R 21/205* (2013.01); *B60R 2021/0004* (2013.01); *B60R 2021/0009* (2013.01); *B60R 2021/23107* (2013.01); *B60R 2021/23308* (2013.01); (Continued)

(58) Field of Classification Search
CPC . B60R 21/233; B60R 21/2338; B60R 21/231; B60R 21/205; B60R 2021/0004; B60R 2021/23107; B60R 2021/23382; B60R 2021/23308; B60R 2021/0009; B60R 2021/23316
USPC .......................................... 280/743.1, 743.2
See application file for complete search history.

(56) References Cited

U.S. PATENT DOCUMENTS 9,272,684 B1 * 3/2016 Keyser .................. B60R 21/237
10,279,770 B2 * 5/2019 Faruque ................ B60R 21/237
10,434,969 B2 * 10/2019 Yamada ................ B60R 21/237
(Continued)

FOREIGN PATENT DOCUMENTS

JP 2015033986 A 2/2015
JP 2015157603 A 9/2015
(Continued)

*Primary Examiner* — Toan C To
(74) *Attorney, Agent, or Firm* — Dinsmore & Shohl LLP

(57) ABSTRACT

There is provided a passenger seat air bag having a portion which is unfolded to a side toward a center side of a vehicle in which a pressure difference in the portion is suppressed. A passenger seat air bag includes a front unfolding portion which is unfolded in front of the passenger seat, and a side unfolding portion which is in communication with the front unfolding portion and which is unfolded to side, of the passenger seat, nearer to a center of the vehicle. A horizontal tether is provided in the side unfolding portion in an arrangement which is approximately horizontal during unfolding. When unfolding gas is injected from the front to the air bag, because the horizontal tether does not block flow of the unfolding gas, pressure us the side unfolding portion is made uniform.

3 Claims, 4 Drawing Sheets

(51) Int. Cl.
  *B60R 21/205*  (2011.01)
  *B60R 21/00*   (2006.01)
(52) U.S. Cl.
  CPC .............. *B60R 2021/23316* (2013.01); *B60R 2021/23382* (2013.01)

(56)            References Cited

U.S. PATENT DOCUMENTS

| | | | |
|---|---|---|---|
| 2009/0302587 A1* | 12/2009 | Thomas | B60R 21/231 |
| | | | 280/743.2 |
| 2011/0062693 A1* | 3/2011 | Williams | B60R 21/2338 |
| | | | 280/743.2 |
| 2015/0042081 A1 | 2/2015 | Yamada | |
| 2015/0367802 A1* | 12/2015 | Fukawatase | B60R 21/205 |
| | | | 280/732 |
| 2016/0207490 A1* | 7/2016 | Yamada | B60R 21/235 |
| 2017/0129439 A1* | 5/2017 | Taguchi | B60R 21/205 |
| 2017/0158154 A1* | 6/2017 | Kobayashi | B60R 21/231 |
| 2017/0217397 A1* | 8/2017 | Sumiya | B60R 21/233 |
| 2017/0355346 A1* | 12/2017 | Kobayashi | B60R 21/0136 |
| 2018/0065581 A1* | 3/2018 | Ohno | B60R 21/01558 |
| 2018/0065583 A1* | 3/2018 | Tabushi | B60R 21/233 |
| 2018/0154856 A1 | 6/2018 | Yamada | |
| 2018/0154857 A1 | 6/2018 | Yamada | |
| 2018/0208143 A1* | 7/2018 | Fischer | B60R 21/205 |
| 2018/0354450 A1* | 12/2018 | Yamada | B60R 21/23138 |

FOREIGN PATENT DOCUMENTS

| | | | |
|---|---|---|---|
| JP | 2017-065395 A | 4/2017 | |
| JP | 2018-094932 A | 6/2018 | |
| JP | 2018-094933 A | 6/2018 | |

\* cited by examiner

PASSENGER SEAT AIR BAG APPARATUS

CROSS REFERENCE TO RELATED APPLICATION

This application claims priority to Japanese Patent Application No. 2017-210800 filed on Oct. 31, 2017, which is incorporated herein by reference in its entirety including the specification, claims, drawings, and abstract.

TECHNICAL FIELD

The present disclosure relates to a passenger seat air bag apparatus, and in particular to a structure of an air bag.

BACKGROUND

In a vehicle, when a load is applied from a front and side surface on a side farther away from a passenger of the vehicle (such as, for example, in the case of an oblique, small overlap, or the like), there may be cases in which a head of the passenger moves toward the front side and the center side of the vehicle.

JP 2017-65395 A discloses a passenger seat air bag of a vehicle. This air bag has a structure in which the air bag is unfolded in front of the passenger, and also to a side, toward a center side of the vehicle.

FIG. 4 is a top view schematically showing a passenger seat airbag of related art, with reference to JP 2017-65395 A. An air bag 100 comprises a portion 102 which is unfolded to the from side and a portion 104 which is unfolded to the side. The portion 102 which is unfolded to the side has a tether 106 provided therein. The tether 106 is formed in a surface shape to expand in an up-and-down direction and also in a left-and-right direction (vehicle width direction), and connects, in left and right directions, an inner wall surface of the portion 104 which is unfolded to the side.

In the air bag 100 shown in FIG. 4, when unfolding gas in injected from the front side and the air bag 100 is unfolded, because of the tether 106, pressures may be considered to differ between a space 108 on a front side and a space 110 on a rear side. In this case, if the head of the passenger contacts a region near a position 112 to which the tether 106 is connected, reaction forces having different magnitudes would be applied from the space 108 and the space 110. In particular, at the position 112, a radius of curvature is reduced by the tether 106, and a case may be considered in which the reaction force is reduced.

An advantage of the present disclosure lies in suppression, in a passenger seat air bag having a portion unfolded to the side toward the center side of the vehicle, of a pressure difference in the portion.

SUMMARY

According to one aspect of the present disclosure, there is provided a passenger seat air bag apparatus comprising: an air bag that is folded and stored in front of a passenger seat of a vehicle during a normal time, and that is unfolded toward a side of the passenger seat by injection of an unfolding gas during unfolding; and an injection mechanism that injects the unfolding gas into the air bag, wherein the air bag comprises a front unfolding portion which is unfolded front of the passenger seat, and a side unfolding portion which is in communication with the front unfolding portion, and which is unfolded to a side, of the passenger seat, nearer to a center of the vehicle, and a tether is provided in the side unfolding portion in an arrangement which is approximately horizontal during unfolding.

The passenger seat air bag is stored in a front portion of the passenger seat such as an instrument panel in front of the passenger seat. When a predetermined condition is satisfied such as when an acceleration sensor detects a predetermined acceleration, the unfolding gas is injected from the injection mechanism, and the air bag is unfolded in front of the passenger seat.

The air bag comprises the front unfolding portion and the side unfolding portion. The front unfolding portion and the side unfolding portion are in communication with each other, and a boundary therebetween is not clear, but here, with reference to a rear surface of the front unfolding portion (surface on the side of the passenger seat), portions behind this surface will be called the side unfolding portion. No particular limitation is imposed on a length of the side unfolding portion extending to the rear side of the vehicles. For example, the side unfolding portion may have a shape extending to a region directly adjacent to the passenger when the passenger of the passenger seat is seated, or may have a shorter length. In the latter case, the side unfolding portion protects the side of the passenger when the passenger has fallen toward the front side to a certain degree. Further, no particular limitation is imposed on a length in the up-and-down direction of the side unfolding portion. For example, the length may assume coverage of a head of a passenger belonging to an average height range, or may assume coverage of the entire upper body.

The tether is a member which is connected to an inner wall surface and another inner wall surface of the air bag, and restricts the shape of the air bag during expansion. No particular limitation is imposed on the shape of the tether, and the tether may have a surface shape, or an elongated string shape. In the side unfolding portion, the tether is provided in an arrangement of approximately horizontal during unfolding. The approximate horizontal refers to an angle, with reference to the horizontal surface, which is closer to horizontal than ±30 degrees. Alternatively, the angle may be set close to the horizontal, such as within ±20 degrees, ±10 degrees, or ±5 degrees. The tether is basically placed only in the side unfolding portion, but when the tether has a trapezoidal shape, for example, a part thereof may extend into the front unfolding portion. In this case also, a primary range (for example, 70% or greater, 80% or greater, or 90% or greater of the overall area of the tether) is placed in the side unfolding portion.

In the side unfolding portion of the air bag, the tether is provided horizontally, and the unfolding gas injected from the front side is approximately uniformly filled. Because of this, the pressure difference at the side unfolding portion can be reduced as compared to the related art in which the tether is provided in the up-and-down direction.

BRIEF DESCRIPTION OF DRAWINGS

Embodiment(s) of the present disclosure will be described by reference to the following figures, wherein.

DESCRIPTION OF EMBODIMENTS

An embodiment of the present disclosure will now be described with reference to the drawings.

Figure 1:
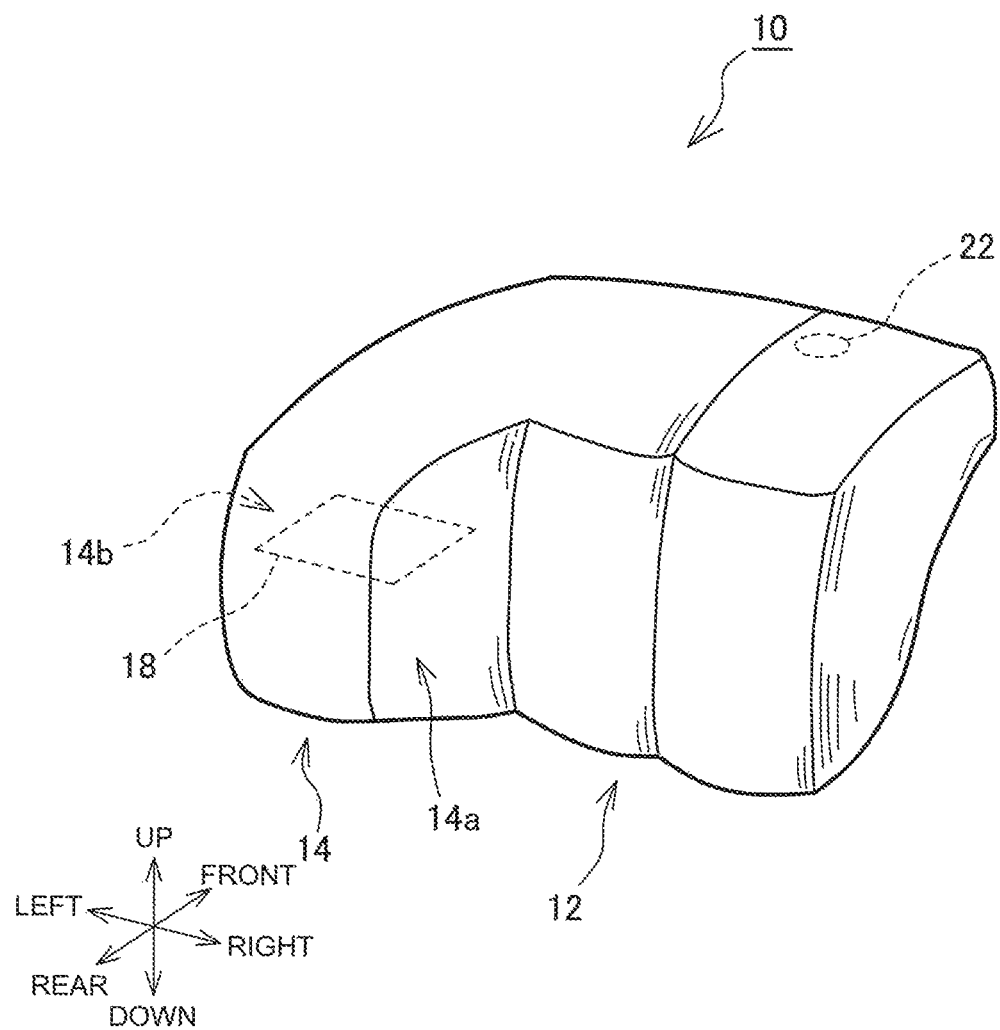
FIG. 1 is a schematic perspective diagram of an air bag according to an embodiment of the present disclosure.

FIG. 1 is a schematic perspective diagram of a passenger seat air bag 10 according to an embodiment of the present disclosure. Coordinates at bottom left show front-and-rear, left-and-right, and up-and-down directions from the viewpoint of a passenger of the vehicle.

The air bag 10 is an air bag in a vehicle in which a driver seat is at a left side of the vehicle, as viewed from the passenger. In other words, the passenger seat is at a right side of the vehicle. The air bag 10 is stored in a storage 22 in a normal time, but when a predetermined condition is satisfied, unfolding gas is filled and the air bag 10 is unfolded. FIG. 1 shows the air bag 10 in the unfolded state.

The air bag 10 is formed by machining a sheet-shape material having flexibility into a bag shape. The air bag 10 comprises a front unfolding portion 12 which expands in front of the passenger seat and a side unfolding portion 14 which expands to a center side of the vehicle. In the air bag 10, a plurality of members called tethers are provided. The tether is provided between inner wall surfaces of the air bag 10, and restricts an unfolded shape of the air bag 10. When no tether is provided, the air bag 10 attempts to expand to a shape near a sphere, in order to maximize the volume thereof. On the other hand, when the tether is provided, because the distance between the inner wall surfaces is restricted by the tether, it becomes possible to unfold the air bag into an intended shape.

FIG. 1 shows a horizontal tether 18 provided in the side unfolding portion 14. The horizontal tether 18 is formed by a plane-shape member. The tether 18 is attached to an inner wall of a side surface 14a on the passenger seat side of the side unfolding portion 14 and to an inner wall of a side surface 14b on the center side. The horizontal tether 18 is arranged to be approximately horizontal during unfolding of the air bag 10.

Figure 2:
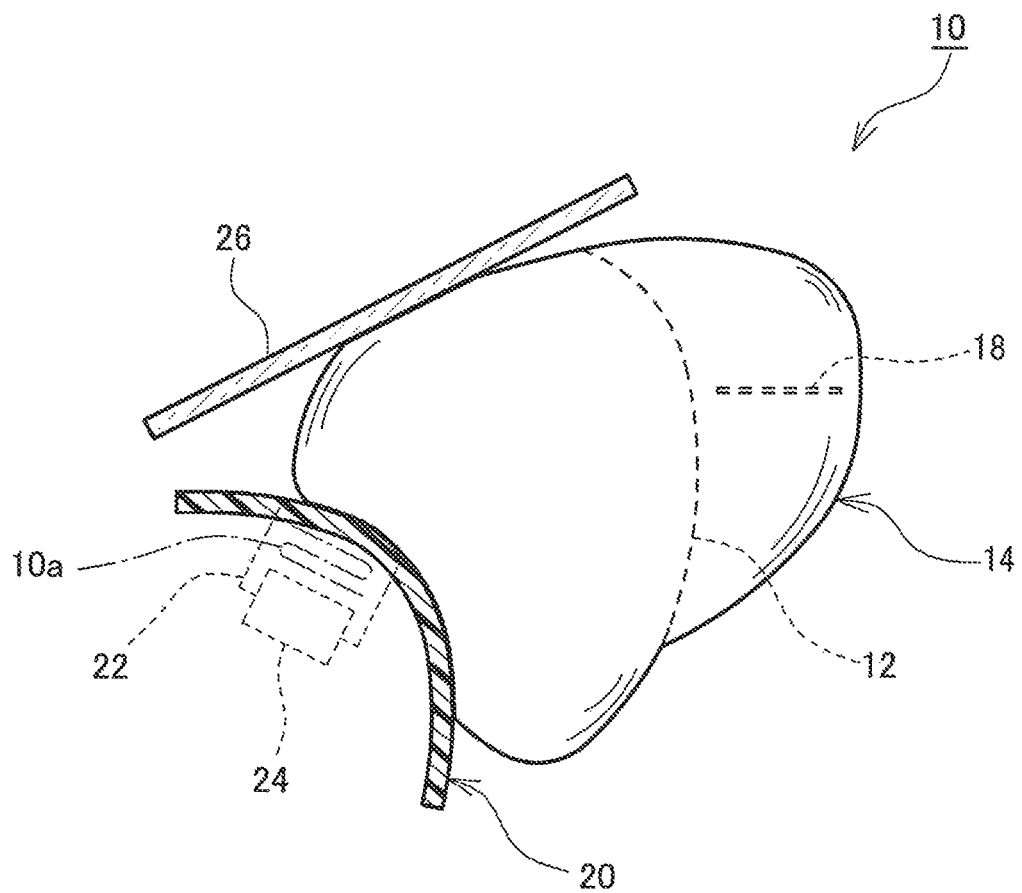
FIG. 2 is a schematic side view of an air bag.

FIG. 2 is a side view of the air bag 10, as viewed from the driver seat side. FIG. 2 also shows a cross section of a windshield 26 and a cross section of an instrument panel 20. In the storage 22 provided inside the instrument panel 20, the air bag 10a which is folded and stored during the normal time is shown. Behind the air bag 10a, an inflator 24 which forms an injection mechanism of the unfolding gas is provided.

Upon injection of the unfolding gas from the inflator 24, the air bag 10 is unfolded in front of the passenger seat while contacting the instrument panel 20 and the windshield 26. As shown in the figures, in the side unfolding portion 14, the horizontal tether 18 is provided approximately horizontally.

Figure 3:
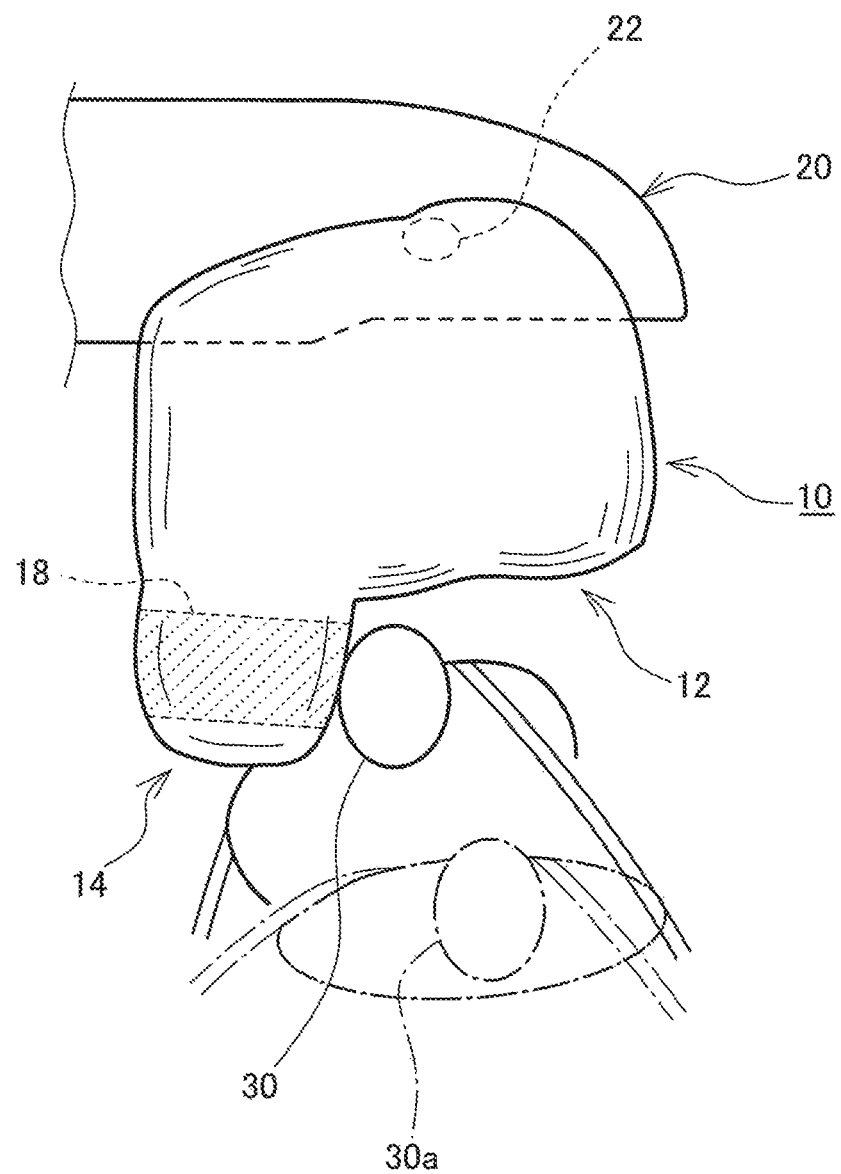
FIG. 3 is a schematic top view of an air bag and a passenger.

Next, with reference to FIG. 3, a behavior of the passenger during the unfolding of the air bag 10 will be described. FIG. 3 is a schematic top view showing the air bag 10 and a periphery thereof. FIG. 3 also shows a passenger 30a on the passenger seat during normal time and a passenger 30 during the unfolding of the air bag 10. The front unfolding portion 12 of the air bag 10 is unfolded in front of the passenger 30a at the normal time, and the side unfolding portion 14 is unfolded to the front and left of the passenger 30a.

Figure 4:
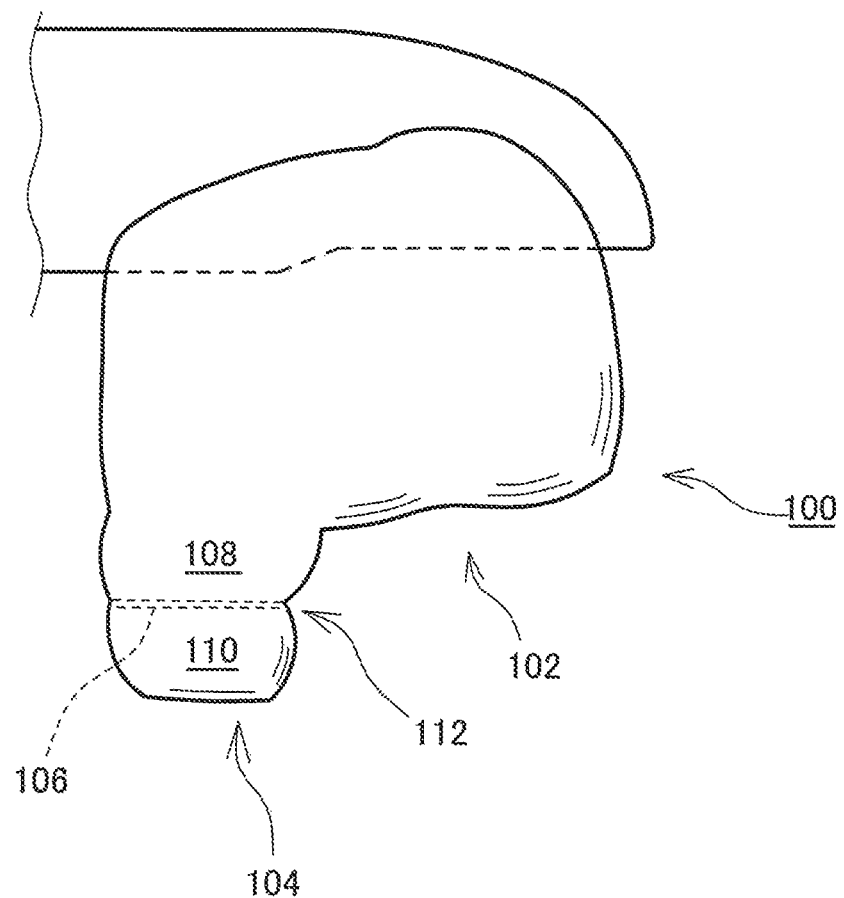
FIG. 4 is a schematic top view of an air bag according to related art.

For example, when the air bag 10 is unfolded when a load is applied from a front and side surface of the driver seat side of the vehicle (such as, for example, in the ease of an oblique, small overlap, or the like), depending on a direction of the load, the passenger 30a may move toward front and center sides of the vehicle. The passenger 30 of FIG. 3 is about to contact the side unfolding portion 14. In this case, unlike the example configuration of FIG. 4, the side unfolding portion 14 is unfolded with approximately the same pressure over the entire structure. Specifically, because the horizontal tether 18 almost does not block the motion of the unfolding gas which is sent from the front, the unfolding gas is approximately uniformly distributed in the side unfolding portion 14, and a uniform pressure is created. As a result, the passenger 30 can contact the side unfolding portion 14 while experiencing a uniform reaction force from the side unfolding portion 14.

Above, a configuration is described in which only one horizontal tether 18 is provided in the side unfolding portion 14. Alternatively, two, or three or more horizontal tethers 18 may be provided at different heights.

In addition, in the above configuration, a plane shape horizontal tether 18 is used, but alternatively, an elongated string shape tether may be used. A string shape tether is horizontally attached to the inner walls of the side surfaces 14a and 14b of the side unfolding portion 14, and restricts a distance between attachment points. By providing a plurality of string shape tethers, there, may be obtained an advantage similar to that obtained in a case, where one or a plurality of the plane shape tether are provided. When the string shape tether is horizontally provided, there may be further provided a string shape tether which connects upper and lower inner wall surfaces of the side unfolding portion 14.

Normally, one, or two or more tethers are provided also on the front unfolding portion 12. These configurations are compatible with the configuration of the present embodiment. However, when the horizontal tether 18 is provided on the side unfolding portion 14, it is desirable to avoid providing the tether in such a manner that it becomes more difficult for the unfolding gas to enter a space above or below the horizontal tether 18. This is because, when a sufficient degree of communication is secured from the front unfolding portion 12 to the side unfolding portion 14, the side unfolding portion 14 can be unfolded approximately uniformly.

The embodiment described above only exemplifies one configuration for practicing the present disclosure, and the present disclosure may be practiced in various other configurations.

The invention claimed is:

1. A passenger seat air bag apparatus comprising:
an air bag that is folded and stored in front of a passenger seat of a vehicle during normal time, and that is unfolded toward a side of the passenger seat by injection of an unfolding gas during unfolding; and
an injection mechanism that injects the unfolding gas into the air bag, wherein
the air bag comprises a front unfolding portion which is unfolded in front of the passenger seat, and a side unfolding portion which is in communication with the front unfolding portion and which is unfolded to a side, of the passenger seat, nearer to a center of the vehicle,
the side unfolding portion includes a protruding portion which is unfolded from the front unfolding portion toward the side of the passenger seat during the unfolding, the protruding portion has a left side wall and a right side wall, and
a tether is provided in the side unfolding portion in an arrangement which is approximately horizontal during the unfolding to connect the left side wall and the right side wall, the tether comprises a plane shape horizontal member.

2. The passenger seat air bag apparatus of claim 1, wherein the tether is located rearward of the front unfolding portion of the air bag in a vehicle front-and-rear direction.

3. The passenger seat air bag apparatus of claim 1, wherein:
- during the normal time, the air bag is folded and stored in an instrument panel;
- during the unfolding, the air bag is unfolded while contacting the instrument panel and a windshield provided above the instrument panel; and
- during the unfolding, the tether is positioned above the instrument panel.

* * * * *